US012658645B2

(12) United States Patent
Wolff et al.

(10) Patent No.: US 12,658,645 B2
(45) Date of Patent: Jun. 16, 2026

(54) PLUG-IN SYSTEM WITH A PLUG-IN CONNECTION AND A MONITORING UNIT AND METHOD OF MONITORING THE PLUG-IN CONNECTION

(71) Applicant: Murrelektronik GmbH, Oppenweiler (DE)

(72) Inventors: Ingo Wolff, Oppenweiler (DE); Heike Jacob, Oppenweiler (DE)

(73) Assignee: Murrelektronik GmbH, Oppenweiler (DE)

( * ) Notice: Subject to any disclaimer, the term of this patent is extended or adjusted under 35 U.S.C. 154(b) by 365 days.

(21) Appl. No.: 18/428,186

(22) Filed: Jan. 31, 2024

(65) Prior Publication Data

US 2024/0313475 A1 Sep. 19, 2024

(30) Foreign Application Priority Data

Mar. 16, 2023 (EP) ..................................... 23162436

(51) Int. Cl.
*H01R 13/641* (2006.01)
*H01R 13/52* (2006.01)
*H01R 43/26* (2006.01)

(52) U.S. Cl.
CPC ....... *H01R 13/641* (2013.01); *H01R 13/5219* (2013.01); *H01R 43/26* (2013.01)

(58) Field of Classification Search
CPC ... H01R 13/641; H01R 13/5219; H01R 43/26
USPC .................................................. 439/271, 489
See application file for complete search history.

(56) References Cited

U.S. PATENT DOCUMENTS

| | | | | |
|---|---|---|---|---|
| 5,179,343 | A * | 1/1993 | Chishima ............... | G01R 31/69 340/687 |
| 5,246,235 | A | 9/1993 | Heinzen | |
| 5,273,456 | A * | 12/1993 | Muzslay .............. | H01R 13/641 439/489 |
| 8,061,211 | B1 | 11/2011 | Bennett | |
| 8,348,689 | B2 * | 1/2013 | Shibata .............. | H01R 13/6215 439/271 |
| 8,465,313 | B2 * | 6/2013 | Shibata .............. | H01R 13/5202 439/271 |
| 10,161,522 | B2 | 12/2018 | Colineau et al. | |
| 10,690,250 | B2 | 6/2020 | Nahrwold et al. | |
| 11,168,792 | B2 | 11/2021 | Nahrwold et al. | |
| 2007/0012117 | A1 | 1/2007 | Hiroki et al. | |

(Continued)

FOREIGN PATENT DOCUMENTS

| | | | |
|---|---|---|---|
| DE | 102007008042 | A1 | 8/2008 |
| DE | 102013000982 | A1 | 7/2017 |

(Continued)

*Primary Examiner* — Gary F Paumen
(74) *Attorney, Agent, or Firm* — Dilworth IP, LLC

(57) ABSTRACT

The present disclosure relates to a plug-in system for producing a plug-in connection, including a plug and a socket. The socket includes a contact element, a contact surface, and an electrically conductive sealing element, which rests against the contact wall and is arranged between the contact element and the contact surface. The plug-in system has a monitoring unit which is set up to detect whether an electrical connection is present via the sealing element in the assembled state of the plug-in connection.

16 Claims, 3 Drawing Sheets

(56) References Cited

U.S. PATENT DOCUMENTS

| | | | | |
|---|---|---|---|---|
| 2007/0117440 | A1* | 5/2007 | Nagashima | H01R 43/005 439/271 |
| 2008/0207032 | A1* | 8/2008 | Horsch | F16J 15/064 439/271 |
| 2009/0315267 | A1 | 12/2009 | Castleman | |
| 2014/0203514 | A1 | 7/2014 | Colineau et al. | |
| 2018/0112779 | A1 | 4/2018 | Nahrwold et al. | |
| 2020/0370655 | A1 | 11/2020 | Nahrwold et al. | |

FOREIGN PATENT DOCUMENTS

| | | | |
|---|---|---|---|
| DE | 102016012552 | A1 | 4/2018 |
| DE | 102018001690 | B3 | 5/2019 |
| EP | 3650700 | A1 | 5/2020 |
| EP | 3767309 | A1 | 1/2021 |
| EP | 4141067 | A1 | 3/2023 |
| FR | 3064119 | A1 | 9/2018 |

* cited by examiner

PLUG-IN SYSTEM WITH A PLUG-IN CONNECTION AND A MONITORING UNIT AND METHOD OF MONITORING THE PLUG-IN CONNECTION

FIELD OF THE DISCLOSURE

Embodiments of the present disclosure relate to a plug-in system for producing a plug-in connection. Further, embodiments of the present disclosure also relate to a method of monitoring the plug-in connection.

BACKGROUND

The prior art discloses, among others, circular connectors having a locking thread, which are used to form a plug-in connection. These circular connectors are used, among other things, to connect actuators, sensors, power supply components, Ethernet and/or fieldbus systems. Such circular connectors in particular offer the advantage that, unlike conventional connector modules installed in switch cabinets, they can be arranged in a distributed manner. Accordingly, the circular connectors can often be used flexibly and be installed easily. Primarily circular connectors of size M12 (IEC 61076-2-101) and M8 (IEC 61076-2-104) have become accepted as a standard in the field of circular connectors. Circular connectors of size ⅞, M23 and M16 are also suitable for more specialized applications.

Due to the wide range of possible arrangements of such circular connectors with regard to the place of use, it is necessary to protect the electrical contact of the plug and the socket from environmental influences such as moisture and impurities when they are plugged together. For this reason, such plug-in connections usually have a socket-side sealing ring and a plug-side threaded sleeve. After coupling with the plug, the socket can be screwed thereto so that the sealing ring is deformed by the front side of the plug, as a result of which the desired tightness of the plug-in connection is finally achieved.

However, some disadvantages result from the design described above. Among other things, the tightness of the plug-in connection depends largely on the compression of the sealing ring. If the sealing ring is not sufficiently pressed, the plug-in connection is potentially not tight. This may occur if the plug is screwed on by hand and the required torque is not applied and/or if the plug becomes loose due to temperature changes or vibrations. It may also happen that the plug and the socket are coupled together in a slightly tilted manner, so that the sealing ring is not pressed evenly or in the desired manner. Furthermore, a sealing ring which is pressed too hard is prone to irreversible material changes (plastic deformations), such as cracking and material wear, which is also disadvantageous. In addition, sealing rings age over time, such that that even properly pressed sealing rings can no longer keep the plug-in connection tight.

One way to overcome the problem of excessive compression or insufficient torque described above is to use torque wrenches by means of which a defined torque is applied. However, using the torque wrench may be forgotten so that a torque which is not sufficient or too high is applied when the plug is screwed on by hand. This is also due to the fact that torque wrenches are not always available. In addition, the torque wrenches cannot react to the state of the sealing ring, as the torque wrenches can only limit the torque when the plug-in connection is established.

The use of mechanical indication elements to check the compression is also known from the prior art. For example, DE 10 2007 008 042 A1 discloses a plug having an indication element which is moved from a hidden position to a visible position when a sealing ring is compressed, so that this can be detected visually. This makes it possible to quickly determine whether the plug and a counterpart such as the socket are connected to each other in accordance with regulations.

However, the disadvantage of the aforementioned systems is that they do not check whether the plug-in connection is permanently established in accordance with regulations. These methods only ensure that the plug-in connection is tight at the time of installation or re-inspection. In other words, the installation according to regulations and the resulting tightness can only be checked manually and on site.

SUMMARY

It is an object to provide a plug-in system by means of which it can easily be determined whether a plug-in connection between the plug and the socket has been established in accordance with regulations.

According to the present disclosure, the object is achieved by a plug-in system for forming a plug-in connection according to the claims.

Advantageous embodiments of the plug-in system according to the present disclosure are specified in the subclaims, the features of which can optionally be combined with each other.

According to the present disclosure, the object is thus achieved by a plug-in system for producing a plug-in connection, comprising a socket for receiving a plug. The socket comprises a contact element, a contact surface and an electrically conductive sealing element. The sealing element is arranged between the contact element and the contact surface. In the assembled state of the plug-in connection, the sealing element establishes an electrical connection between the contact surface and the contact element. The sealing element is designed such that in an unstressed state of the sealing element, an electrical connection between the contact element and the contact surface is interrupted. The plug-in system also has a monitoring unit which is electrically connected to the contact element and the contact surface. The monitoring unit is set up to detect (electrically) whether there is an electrical connection via the sealing element in the assembled state of the plug-in connection.

The basic idea is providing a plug-in system which reliably detects whether a plug-in connection is correctly formed. In particular, only components of the socket are used to determine whether the plug has been correctly plugged, in particular correctly screwed into the socket. This is possible because when the plug-in connection is present, i.e., when the plug is inserted (and screwed) into the socket, the sealing element is stressed by the plug and is deformed. As a result of the deformation of the sealing element, the electrically conductive sealing element simultaneously contacts both the contact element of the socket and the contact surface of the socket, as a result of which an electrically conductive connection is formed between the contact element and the contact surface via the electrically conductive sealing element. The contact element and the contact surface are also made of an electrically conductive material, in particular the component of the socket on which the contact surface is provided. The monitoring unit, which is connected to the contact element and the contact surface, can therefore determine whether the sealing element has been deformed such that there is an electrical connection.

The presence of the electrical connection is therefore associated with a certain geometric state of the electrically conductive sealing element, namely a deformed geometric state in which the sealing functionality is ensured. In other words, the deformation of the sealing element represents a different geometric state of the sealing element compared to the geometric state of the sealing element in the initial state thereof. This can be detected electrically, as the other geometric state of the sealing element, i.e., the deformation of the sealing element, leads to the formation of the electrical connection, as the electrically conductive sealing element contacts both the contact element and the contact surface due to the deformation.

In principle, the sealing element and/or the contact element are/is configured such that the electrical connection is only present when the plug-in connection is formed, in particular correctly, i.e., with a defined deformation of the sealing element which corresponds to the desired compression of the sealing element. In particular, the sealing element is configured such that the electrical connection is only present if the sealing element has been sufficiently deformed so that the sealing element also fulfills its sealing function.

The defined deformation can be achieved by the sealing element having a shape in its initial state, i.e., when the plug-in connection is not present, in which there is no electrical contact with the contact element and the contact surface. Alternatively or additionally, the contact element can be shaped, in particular on its end face facing the sealing element, such that there is no contact between the contact element and the sealing element in the unstressed state of the sealing element.

In contrast thereto, the electrical connection is established when the plug-in connection is (properly) formed, as this results in a change in the shape of the sealing element, as a result of which the sealing element contacts the contact element and the electrical connection is thus established.

It is therefore easy to determine, in particular digitally, whether the sealing element fulfils its sealing function or not. A visual check of indicators or a (manual) check of the torque can therefore be omitted.

The monitoring by means of the monitoring unit is based on the deformation of the sealing element. If the sealing element is deformed or pressed, then the sealing element contacts the at least one contact element and the contact surface simultaneously, as a result of which an electrically conductive connection is established between the contact element and the contact surface. This corresponds to the presence of a switching signal, as an electrical signal is present, which can be detected or monitored when the electrical connection is established.

For example, the electrical connection is established between the contact element and a component of the socket on which the contact surface is formed. The plug is therefore electrically irrelevant for monitoring, as the plug merely ensures that the sealing element is sufficiently deformed to ensure the electrical connection between the contact element and the component of the socket, for example a threaded sleeve of the socket. If the threaded sleeve of the socket is made of an electrically non-conductive material, e.g. a plastic material, the component of the socket may be a contacting element with which the contact element establishes the electrical connection via the deformed sealing element, which is detected by the monitoring unit.

Optionally, the quality of the produced plug-in connection can be monitored electrically by means of the monitoring unit by detecting a parameter relevant to the geometric state of the sealing element, in particular electrically. In other words, an existing electrical signal is detected and evaluated to draw conclusions about the geometric state of the sealing element and the sealing properties of the sealing element. However, the electrical signal is only present if the geometric state of the sealing element has reached a certain state, i.e., if there is a defined deformation of the sealing element.

In contrast to known mechanical indication elements or tools such as torque wrenches, which can only be used directly in the vicinity of the plug-in connection, the variant proposed here is versatile. This is made possible by the fact that at least one of the components of the plug-in connection, i.e., at least one of the contact elements, and the monitoring unit are electrically connected to each other.

Consequently, the plug-in system is basically adapted to use the monitoring unit to electrically monitor the plug-in connection for proper installation with regard to a minimum insertion depth and consequently for tightness, in particular the quality with regard to tightness of the produced plug-in connection, by detecting the parameter representative of the geometric state of the sealing element (minimum compression of the sealing element). If the plug-in system is designed such that the plug and the socket are screwed together, the installation in accordance with regulations can be monitored electrically with regard to a minimum screw-in depth.

Accordingly, the plug-in system offers the advantage that the monitored plug-in connection can be arranged anywhere in a system and the monitoring unit can be used to electrically check whether the produced plug-in connection is tight.

The monitoring unit and the plug-in connection can advantageously be arranged spatially separately, which makes the system more flexible overall. It is in particular possible to easily monitor several plug-in connections simultaneously and centrally by means of the monitoring unit.

The tightness of the plug-in connection can be easily detected via the geometric state of the sealing element. It has been recognized that the tightness of the produced plug-in connection correlates with the geometric state of the sealing element. Consequently, the plug-in system mentioned here is not designed to monitor the wear of a seal, but to determine via the geometric state whether the plug-in connection composed of a plug and a socket has been produced correctly, i.e., to check whether the plug and the socket are correctly coupled to each other.

One aspect of the present disclosure provides that the monitoring unit is set up to detect a deformation of the sealing element.

When the plug-in connection is produced between the plug and the socket, a volume located between the plug and the contact element of the socket is reduced when the plug-in connection is formed. As a result, the sealing element is deformed, causing it to make contact with the contact element of the socket and the contact surface of the socket, thus forming the electrical connection within the socket. Since the presence of the electrical connection is monitored by the monitoring unit, the monitoring unit at least indirectly monitors any deformation of the sealing element.

In particular, the monitoring unit can also monitor a parameter corresponding to the upsetting or deformation. A parameter corresponding to the upsetting or deformation may be any parameter which makes it possible to draw conclusions about the geometric state of the sealing element.

According to a further aspect, the monitoring unit has a measuring unit which is set up to detect at least one electrical characteristic value of the electrical connection between the contact element and the contact surface. This electrical characteristic value is mainly influenced by the electrically conductive sealing element, in particular by the geometric state of the electrically conductive sealing element.

Consequently, the parameter corresponding to the upsetting or deformation of the sealing element can be an electrical resistance value, an electrical conductivity, a capacitance or an inductance. When the plug is inserted into the socket, the sealing element contacts the contact element and the contact surface simultaneously from a certain insertion depth of the plug, which is accompanied by a deformation of the sealing element. As a result of this contact, the contact element and the contact surface can be electrically coupled via the electrically conductive sealing element, in particular short-circuited, which in turn can be detected by the measuring unit. The measured electrical characteristic value depends directly on the insertion depth of the plug, as this influences the deformation of the sealing element.

Advantageously, the electrical characteristic value described above is independent of other boundary conditions, as the electrical characteristic value depends on the geometric state of the electrically conductive sealing element. The electrical characteristic value thus depends on the geometric state of the electrically conductive sealing element, i.e., the deformation thereof.

A further aspect of the present disclosure provides that the monitoring unit has an evaluation unit which is connected in an information-exchanging manner to a database in which predetermined electrical characteristic values associated with deformations are stored. The evaluation unit is set up to determine the deformation of the sealing element on the basis of the electrical characteristic values stored in the database.

Due to the link between the deformation and the predetermined electrical characteristic values stored in the database, it is possible to determine a deformation of the sealing element by a simple comparison with the electrical characteristic value measured by the measuring unit, i.e., a specific geometric state of the sealing element. In this respect, the measured electrical characteristic value can be used to make a statement about the geometric state, i.e., the deformation of the sealing element, in particular how much it is deformed. In other words, a qualitative statement can be made as to whether the sealing element has been deformed sufficiently and not too much. Furthermore, it is even possible to determine whether the (proper) deformation is too large or too small.

The predetermined electrical characteristic values can be measured experimentally in advance for the respective seal type or the respective sealing element and then stored in a database. Consequently, at least one data set of predetermined electrical characteristic values linked to deformations is stored in the database for the respective seal type.

The evaluation unit may have a calculation unit which calculates a compression value from the deformation of the sealing element, in particular a compression value having the following formula:

$$v_{geo} = \frac{h_0 - h_1}{h_0}$$

Here, $v_{geo}$ represents the compression value which can be calculated from the above formula, wherein $h_0$ represents the height of the sealing element in the unstressed, i.e., non-deformed state. The height $h_0$ therefore refers to the distance from the lower side of the sealing element to the upper side of the sealing element. The lower side and the upper side are therefore opposite to each other. $h_1$ refers to the distance between the two aforementioned sides in the deformed state, i.e., the height of the sealing element in the stressed state.

This allows a compression value to be calculated from the above formula, which indicates the geometric state of the sealing element by means of a single value $v_{geo}$, so that this can be reused or output, in particular to a user. In addition, the compression value is a value which describes the geometric state of the seal in the assembled state, wherein the original or unstressed state of the sealing element is included. This allows conclusions to be drawn about the tightness of the plug-in connection.

A further aspect of the present disclosure provides that the monitoring unit has a user interface which is set up to provide a user with at least one piece of information about the geometric state of the sealing element, in particular wherein the user interface provides the compression value.

The user interface can be used to easily output the geometric state of the sealing element to the respective user, regardless of the position and location on installation of the plug-in connection. The user can assess the geometric state of the sealing element in the produced plug-in connection, in particular whether the associated plug-in connection is sufficiently inserted or screwed in such that the sealing element provides its sealing function.

Furthermore, the monitoring unit can be set up to send a warning signal to the user interface in addition to the at least one piece of information.

The warning signal can then be output if the monitoring unit determines that there is no electrical connection, although the plug-in connection is considered to be formed.

In this respect, the warning signal is output if no switching signal has been detected, i.e., no electrical connection has been established.

If a qualitative evaluation of the established electrical connection is monitored, the warning signal can also be output if the electrical characteristic value reaches, exceeds or falls below a predetermined threshold value, which is associated with the geometric state of the sealing element reaching, exceeding or falling below a predetermined threshold value.

In other words, the user can be informed directly by a warning signal if the plug-in connection is not produced correctly, for example if it is not sufficiently inserted, and therefore the sealing element is not sufficiently compressed or deformed, which is associated with an insufficient sealing effect. For example, the user can be informed by an acoustic or visual warning signal that the respective plug-in connection is not sufficiently compressed. The warning signal may therefore be an acoustic warning signal or a visual warning signal. In particular in the case of several plug-in connections, it is therefore easy to determine which one of the several plug-in connections has not been produced correctly, e.g. has not been inserted sufficiently. The effort required for troubleshooting can therefore be significantly reduced.

The visual warning signal can be output as a warning message, e.g. as a text. The corresponding text can read "Please tighten plug" or similar. The plug which is to be tightened can also be specified, an address information of the plug or socket being used.

In principle, the warning signal can be evaluated and implemented by a higher-level system, for example a cloud application. The warning signal can therefore be output as part of a maintenance plan.

In particular, the monitoring unit can be set up to send a warning signal in addition to the compression value if the compression value is not within a predetermined range, for example from 5 to 50%, preferably from 10 to 35%.

The aforementioned ranges indicate compression values in which the sealing element is particularly well compressed. If the specified ranges are exceeded or undershot, the sealing element is not sufficiently compressed or is compressed too much. If the minimum compression is not achieved, the plug-in connection is potentially leaking. If the maximum compression is exceeded, material properties can be irreversibly changed, for example the relaxation behavior. Exceeding the maximum compression value poses a particular problem if the connection is released again and the sealing element does not return to its initial geometric state. Re-establishing such a plug-in connection can therefore lead to a potentially leaky plug-in system.

If there is less compression when the plug-in connection is produced, there may be a leaky plug-in connection. If the pressure is greater, this can lead to damage to the sealing element, which is also undesirable.

In principle, a digital evaluation of the plug-in connection can be carried out, i.e., whether there is sufficient deformation of the sealing element, which is accompanied by the formation of the electrical connection, which corresponds to a switching signal.

Optionally, a qualitative evaluation of the produced plug-in connection can also be carried out by recording and evaluating the electrical characteristic value, which allows conclusions to be drawn about the deformation of the sealing element or the compression value of the sealing element.

For example, the sealing element rests against the contact surface in the unstressed state (initial state). In this respect, it is provided that the sealing element only rests against the contact surface in the initial state, but not against the contact element, as a result of which there is no electrical connection between the contact element and the contact surface. When the plug-in connection is formed, the sealing element is deformed such that it then also rests against the contact element, thus establishing the electrical connection.

Alternatively, it may be provided that the sealing element only rests against the contact element in the initial state, but not against the contact surface. Only when the plug-in connection is made is the sealing element then deformed so as to also rest against the contact surface, thus establishing the electrical connection.

In a further embodiment, the sealing element does not rest against either the contact element or the contact surface in the initial state. Only when the plug-in connection is produced is the sealing element then deformed so as to rest against the contact element and the contact surface, thus establishing the electrical connection.

According to a further aspect of the present disclosure, the contact surface is formed on a threaded sleeve which is stationary. The threaded sleeve is formed from an electrically conductive material, so that the threaded sleeve can be part of the electrical connection present in the assembled plug-in connection.

As the threaded sleeve is stationary, it is also ensured that the threaded sleeve does not have to be rotated to establish the screw connection between the plug and the socket, which reduces the stress on the sealing element.

Alternatively, it may be provided that the threaded sleeve is made of a material that is not electrically conductive. The contact surface is then not formed on the threaded sleeve, but on a separately formed component of the socket, for example a contacting element. The electrical connection in the assembled state, i.e., when the plug-in connection is present, is then between the contact element and the contacting element on which the contact surface is provided.

It is also possible that a latching sleeve is provided instead of a threaded sleeve. In this respect, a threaded connection between the socket and the plug can be dispensed with, as the locking is then achieved by latching.

The contact element may be designed as a contact pin, i.e., be rod-shaped or pin-shaped. The contact pin can simply contact the sealing element by means of an end face.

The contact element can be at least partially embedded in a contact carrier, the contact carrier providing a support surface for the unstressed sealing element. The design described here makes it possible to provide the contact element for contacting the sealing element in a simple manner. In particular, the contact carrier has a receptacle for the contact element, in particular the contact pin. The receptacle may also be subsequently incorporated into the contact carrier by a bore. The contact carrier therefore at least partially accommodates the contact element.

In addition, in the unstressed non-deformed state, i.e., in the initial state, the electrically conductive sealing element rests on a support surface of the contact carrier which may also be referred to as a sealing surface. The support surface may be an edge area of an opening in the contact carrier in which the contact element is arranged.

The contact carrier can provide a plurality of contact openings on its front side for corresponding electrical contacts of the plug. In this way, the socket is designed accordingly for accommodating the plug, in particular the electrical contacts of the plug.

According to a further aspect, a plurality of contact elements may be provided, which are arranged so as to be distributed along the circumference of the contact carrier. A plurality of contact elements can accordingly contact the sealing element at several points, so that the electrical connection is formed via at least two contact elements and the sealing element, which contacts the at least two contact elements in the deformed state. One of the two contact elements therefore has the contact surface.

This can also create redundancy if one of the contact elements should fail. In addition, measurement errors can thus be avoided or reduced.

The contact carrier may have a stop which limits the insertion depth of the plug. The stop offers a simple way of ensuring that the plug-in connection is tight, more specifically when the plug is inserted up to the stop.

The stop therefore ensures that deformation of the sealing element is limited so that the sealing element is not overstressed or damaged when the plug-in connection is produced.

It is also advantageous if the contact element has a convexly shaped front side which faces the sealing element. A convex front side enables a larger contacting surface which can touch or contact the sealing element in the deformed state. In this way, it can be ensured that the electrical connection is reliably formed when the sealing element is deformed accordingly.

A further aspect provides that the sealing element is present in the form of a molded seal or a sealing ring, in particular an O-ring. This allows a cost-effective sealing element to be used.

Basically, the plug-in system may have a locking mechanism which is set up to secure the produced plug-in connection. The locking mechanism also ensures that the sealing element is sufficiently deformed if this is not the case when the plug is inserted into the socket. For this purpose, the locking mechanism comprises a first component having a thread, which is arranged on the plug, and a second component having a mating thread, which is arranged on the socket. The two components therefore form a threaded connection if they are screwed together. For example, one of the components is designed as a union nut or knurled nut.

For example, a thread is provided on the contact carrier of the socket and the mating thread on the plug so that the plug can be screwed into the socket. The knurled nut may be provided on the plug to screw the plug in.

The plug-in system can also comprise the plug, which deforms the sealing element in the assembled state, i.e., when the plug-in connection is formed, to establish the electrical connection.

Furthermore, embodiments of the present disclosure relate to a method of forming a plug-in connection using a plug-in system as described above, the method comprising the following steps:

providing the plug-in system, inserting a plug into the socket so that the plug acts on the sealing element such that the sealing element deforms, an electrically conductive connection being thus established between the contact element and the contact surface via the sealing element.

The advantage of such a method is that it is easy to determine whether a plug-in connection has been properly formed, i.e., whether the plug has been sufficiently inserted, which is accompanied by a defined deformation of the sealing element.

In principle, the sealing element and adjacent components of the socket are configured such that the electrical connection between the contact element and the contact surface is only present via the deformed sealing element if the sealing element simultaneously provides its sealing function (due to its deformation).

Advantageously, an electrical characteristic value is recorded via the monitoring unit which is connected to the contact element and the contact surface.

The electrical monitoring of the plug-in system generally makes it possible to detect insufficiently or excessively compressed sealing elements so that these plug-in connections can be corrected at an early stage. In this way, leaking plug-in connections can be detected in good time, which increases the overall safety of such plug-in connections.

After the plug has been inserted into the socket, the plug and the socket can be screwed together, the plug being thus pulled further in the direction of insertion, in particular until the plug makes contact with the stop of the contact carrier. The sealing element is thus deformed to the desired state, which is monitored by the monitoring unit.

At the same time, the threaded connection ensures that the established plug-in connection is not undesirably released. To do this, the threaded connection must first be loosened. The locking mechanism therefore also acts as a safety device.

In principle, it is therefore possible to ensure that a defined deformed sealing element is present when the plug-in connection is established. The defined deformed sealing element is achieved, among other things, by arranging it on the contact surface. This is also supported by the stop formed on the contact carrier.

BRIEF DESCRIPTION OF THE DRAWINGS

The present disclosure is described in more detail below on the basis of embodiments with reference to the accompanying drawings, which are not to be understood in a restrictive sense and in which.

DETAILED DESCRIPTION

Figure 1:
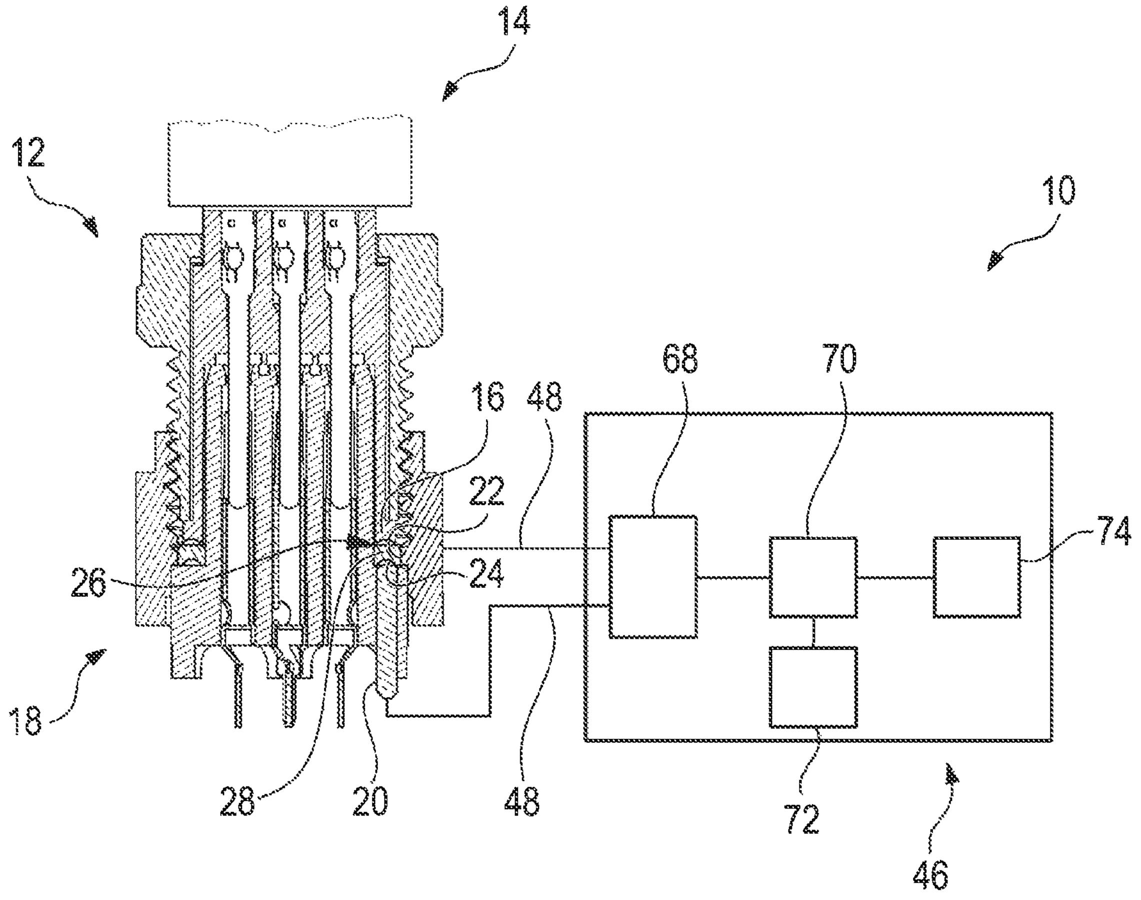
FIG. 1 shows a schematic overview of the plug-in system according to the present disclosure.

FIG. 1 schematically shows a plug-in system 10 for establishing a plug-in connection 12. The plug-in system 10 comprises a plug 14 having an actuating element 16 and a socket 18.

The socket 18 comprises a contact element 20 and a contact surface 22. The contact element 20 has an end face 24 which faces the plug 14, in particular the actuating element 16.

When the plug-in connection 12 is established, the contact element 20 and the actuating element 16 define a sealing space 26 between them, in which an electrically conductive sealing element 28 is arranged, which is also part of the socket 18.

Figure 2:
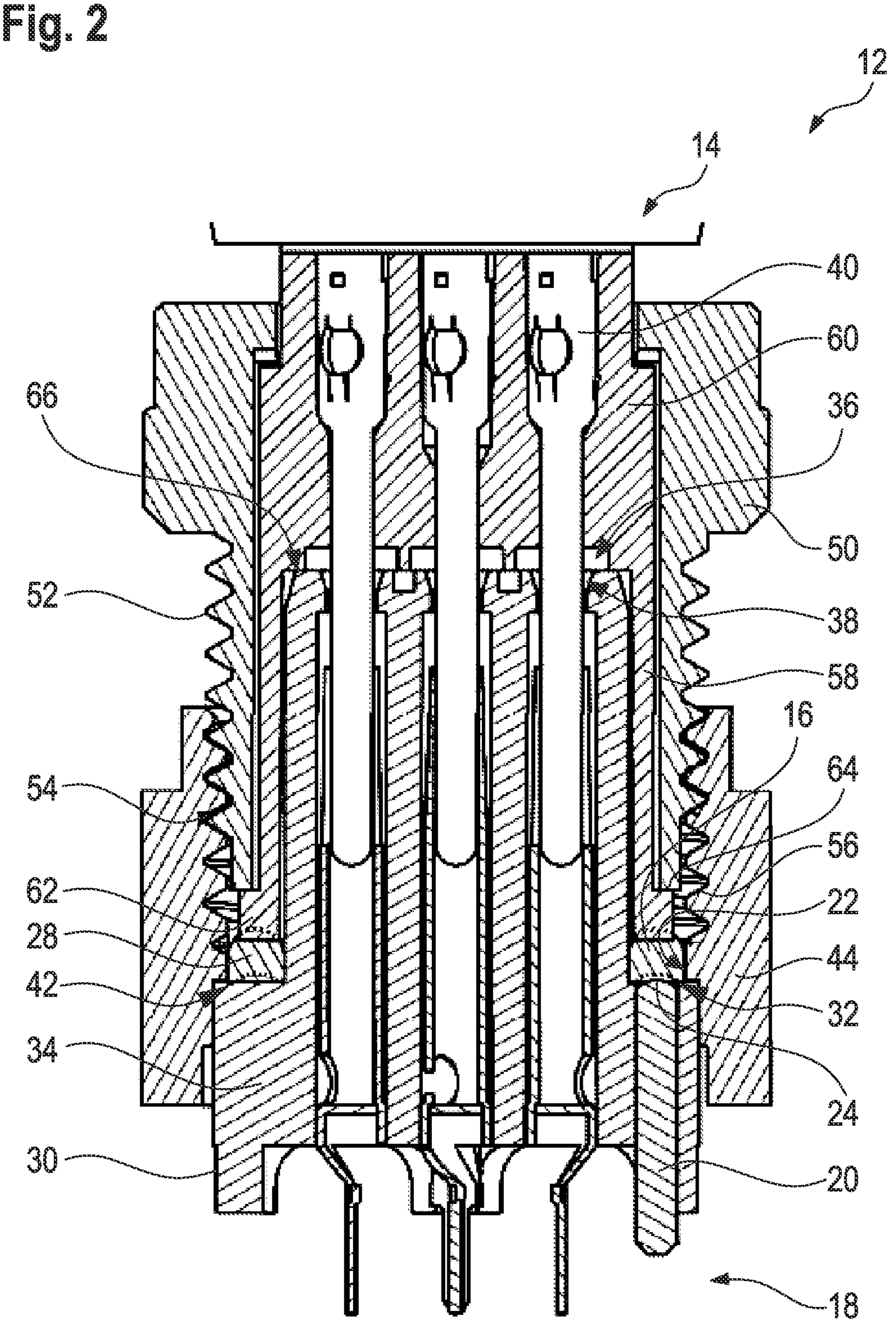
FIG. 2 shows a cross-sectional view of an established plug-in connection according to the plug-in system shown in FIG. 1.

FIG. 2, to which reference is made below, shows the structure of the socket 18 in more detail, from which the mode of operation of the sealing element 28 also becomes more apparent.

The socket 18 has a contact carrier 30, which has an opening 32 in which the contact element 20 is arranged, which in the embodiment shown is designed as a contact pin. In this respect, the contact element 20 is pin-shaped or rod-shaped. The opening 32 can be a receptacle which accommodates the contact element 20 completely or at least partially. The receptacle can be formed by a bore in the contact carrier 30.

At the end of the contact carrier 30 facing away from the plug 14, a base section 34 is provided, in which the opening 32 or the receptacle for the contact element 20 is provided. The contact element 20 is therefore provided in the base section 34 of the contact carrier 30.

Starting from the base section 34, the contact carrier 30 extends in the direction of the plug 14 and forms a flat front side 36 with its free end, which provides a plurality of contact openings 38 for accommodating corresponding electrical contacts 40 of the plug 14.

Furthermore, a support surface 42 is provided on the contact carrier 30, in particular in the area of the base section 34, which extends at least in sections around the contact carrier 30 and forms a support for the sealing element 28. Accordingly, the sealing element 28 is arranged on the support surface 42. In this respect, the sealing element 28 rests on the contact carrier 30 in the unstressed state.

In particular, the support surface 42 surrounds the opening 32 in which the contact element 20 is arranged.

It is particularly clear from FIG. 2 that the sealing element 28 in its unstressed state (shown in a dashed line) has a side facing the contact element 20, in particular the front side 24 thereof, which is concave, i.e., curved inwards. The curvature of the concavely shaped side of the sealing element 28 is thus provided in the region of the opening 32.

In the embodiment shown, the front side 24 of the contact element 20 is convexly shaped towards the sealing element 28, i.e., curved outwards. In this respect, the opposite sides of the sealing element 28 and the contact element 20 have corresponding shapes in the initial state, which in particular ensures a constant distance.

In principle, the front side 24 of the contact element 20 can also have a different shape, e.g. be concave or flat.

The front side 24 of the contact element 20 can be flush with the side of the base section 34 facing the plug 14. However, it is also conceivable that the side 24 of the contact element 20 is not flush with the base section 34, but instead protrudes, i.e., protrudes beyond the support surface 42. Advantageously, a better contacting of the sealing element 28 when the plug-in connection 12 is present can be achieved.

In the initial state, the shape of the sealing element 28 ensures that an electrical connection between the contact element 20 and the contact surface 22 is interrupted, as the sealing element 28 at least does not rest against the contact element 20.

In addition, the sealing element 28 has a convex shape on its opposite side, namely the side facing away from the contact element 20, i.e., an outwardly curved surface via which the sealing element 28 is actuated by the actuating element 16 of the plug 14 when the plug-in connection 12 is formed.

The formation of the plug-in connection 12 results in the sealing element 28 being deformed by the actuating element 16 of the plug 14 when the plug 14 is inserted into the socket 18, so that the sealing element 28 is deformed and contacts the contact element 20. This was not the case in the initial state.

When the plug-in connection 12 is present, the sealing element 28 therefore not only contacts the contact element 20, but also still contacts the contact surface 22, which was already the case in the initial state. In other words, the sealing element 28 is arranged between the contact element 20 and the contact surface 22, which is formed on a threaded sleeve 44 in the embodiment shown.

The threaded sleeve 44 is made of an electrically conductive material, so that in the deformed state of the electrically conductive sealing element 28 there is a continuous electrical connection from the contact element 20 via the sealing element 28 to the contact surface 22.

If the threaded sleeve 44 is made of an electrically non-conductive material, the contact surface 22 can be provided on a separately formed contacting element (not shown here), which is electrically conductive, so that when the plug-in connection 12 is present, i.e., when the sealing element 28 is correspondingly deformed, an electrical connection is established between the contact element 20 and the contacting element via the deformed sealing element 28.

It is also possible to provide a plurality of contact elements 20, so that an electrical connection is formed via two contact elements 20 and the deformed sealing element 28 when the plug-in connection 12 is present, i.e., when the sealing element 28 is deformed accordingly. One of the contact elements 20 then has the contact surface 22.

Basically, the plug-in system 10 comprises a monitoring unit 46, which is shown schematically in FIG. 1.

The monitoring unit 46 is connected via lines 48 both to the contact element 20 and to the contact surface 22, in particular to the component of the socket 18 on which the contact surface 22 is provided, for example the threaded sleeve 44.

The monitoring unit 46 is basically set up to detect whether an electrical connection is present via the electrically conductive sealing element 28, i.e., an electrical connection between the contact element 20 and the contact surface 22, in the assembled state of the plug-in connection 12.

This electrical connection is only present if the electrically conductive sealing element 28 is sufficiently deformed when the plug-in connection 12 is formed, which is associated with proper installation, so that the sealing element 28 has its sealing functionality.

The monitoring unit 46 can therefore provide digital monitoring, as it detects whether there is an electrical connection or not, i.e., a digital "1" or a digital "0". As described above, the presence of the electrical connection is associated with a defined sealing functionality of the sealing element 28. It is therefore possible to digitally monitor whether the sealing element 28 seals the plug-in connection 12.

Furthermore, the threaded sleeve 44 shown in FIG. 2 completely surrounds the contact carrier 30 at the circumference and partially in the axial direction.

In particular, the threaded sleeve 44 is immovable along the axial direction of the socket 18, as a result of which neither the threaded sleeve 44 nor the sealing element 28 resting thereagainst has to be moved to form the plug-in connection 12.

Rather, the plug 14 has a union nut 50 having an external thread 52, the union nut 50 being arranged so as to be movable to form a threaded connection 54 with the threaded sleeve 44.

For this purpose, the threaded sleeve 44 has an internal thread 56 which, in the assembled state of the plug-in connection 12, can cooperate with the external thread 52 of the plug 14, which is provided, for example, on a union nut 50 designed as a knurled nut.

The threaded connection 54 corresponds to a locking mechanism which is set up to secure the formed plug-in connection 12.

The external thread 52 annularly surrounds an internal circumferential wall 58 of the plug 14. The circumferential wall 58 is part of the actuating element 16, which is designed as a contact carrier sleeve 60 in the embodiment shown.

The contact carrier sleeve 60 has a thickening portion 62 at the end, which serves as a stop 64 for the union nut 50.

The threaded connection 54 or the locking mechanism ensures that the sealing element 28 undergoes sufficient deformation when the plug-in connection 12 is formed.

The circumferential wall 58 of the contact carrier sleeve 60 has a closed annular design and extends in the direction of the socket 18.

Furthermore, in addition to the circumferential wall 58, the contact carrier sleeve 60 has a support area 66 which rests against the front side 36 of the contact carrier 30 in the assembled state. The support area 66 is provided with a plurality of openings, from each of which the electrical contacts 40 projects and which protrude into the corresponding contact openings 38 of the contact carrier 30 in the assembled state of the plug-in connection 12 to establish an electrical contact.

The front side 36 of the contact carrier 30 thus represents a stop for the contact carrier sleeve 60, so that an insertion depth of the plug 14 is limited in the assembled state of the plug-in connection 12. The height of the contact carrier 30 and the depth of the circumferential wall 58 of the contact carrier sleeve 60 are adapted to each other such that excessive tightening of the threaded connection 54 is prevented. The sealing element 28 can therefore not be upset any further than permissible when the plug 14 is inserted into the socket 18.

If the plug-in connection 12 is screwed to the stop, the sealing element 28 is contacted simultaneously by the contact element 20 and the contact surface 22, which is formed on the threaded sleeve 44 in the present case.

The sealing element 28 is preferably designed as a molded seal, as shown. Alternatively, the sealing element 28 can however also be designed as an O-ring, which is arranged along the support surface 42.

The electrical conductivity of the sealing element 28 can be achieved by the sealing element 28 being made of a rubber-elastic material which is electrically conductive. Alternatively, the sealing element 28 can be made of an electrically conductive polymer. It is also conceivable that the sealing element 28 is provided with electrically conductive particles such as carbon compounds, conductive carbon black, graphite and/or metal additives, which ensure the electrical conductivity of the sealing element 28. Alternatively, the surface of the sealing element 28 can also be provided with a conductive material by means of a coating.

The contact element 20 is also made of an electrically conductive material. For example, the contact element 20 can be made of surface-treated brass.

In this context, it should be noted that all components contacting the sealing element 28, with the exception of the contact element 20 and the contact surface 22, are formed from an electrically non-conductive material or are provided with an electrically non-conductive coating. In this way, it can be ensured that the sealing element 28 is only electrically contacted by the contact element 20 and the component of the socket 18 on which the contact surface 22 is provided.

The formed plug-in connection 12 can be monitored by means of the monitoring unit 46 shown in FIG. 1 to determine whether a proper plug-in connection has been established with the plug-in system 10 according to the present disclosure.

The monitoring unit 46 is initially designed to determine in a digital manner whether the sealing element 28 fulfills its sealing function or not, as this is associated with the presence of the electrical connection between the contact element 20 and the contact surface 28, which only occurs when the sealing element 28 has been sufficiently deformed.

The monitoring unit 46 comprises a measuring unit 68 which is set up to detect an electrical characteristic value of the electrical connection between the contact element 20 and the contact surface 22, for example an electrical resistance, an electrical conductivity, a capacitance or an inductance. The electrical characteristic value is representative of the geometric state of the sealing element 28, i.e., the deformation thereof.

It is optionally possible to monitor the quality of the plug-in connection 12 by means of the monitoring unit 46. The electrical characteristic value can be used for this purpose.

The measuring unit 68 can be connected to an evaluation unit 70, which evaluates the electrical characteristic value recorded. For this purpose, the evaluation unit 70 can be connected in an information-exchanging manner to a database 72, in which predetermined electrical characteristic values associated with deformations are stored. The evaluation unit 70 can then determine the deformation of the sealing element 28 on the basis of the characteristic values stored in the database 72, in particular whether the deformation is ideal or sufficient, but rather too much or rather too little. In other words, it is possible to make a qualitative evaluation of the existing deformation of the sealing element 28 which results in an electrical connection. The evaluation unit 70 and/or the database 72 can be integrated in the monitoring unit 46, as shown as an example in FIG. 1, or can be designed separately therefrom, for example as part of a cloud. The evaluation by means of the evaluation unit 70 can therefore be carried out by a server system, for example using artificial intelligence.

Optionally, it can be provided that the evaluation unit 70 is set up to calculate a compression value based on the recorded electrical characteristic value by assigning the recorded electrical characteristic value to a corresponding deformation of the sealing element 28, as a result of which a compression value can be determined.

In addition, a user interface 74 can be provided, by means of which information about the electrical connection is made available and/or a warning signal is output. In particular, a state of the sealing element 28 can be output via the user interface 74.

In particular, the user interface 74 can be arranged spatially separated from the aforementioned components of the monitoring unit 46. The user interface 74 can be designed as a monitor or any other display panel.

It is also conceivable that a maintenance plan is generated, for example by means of a cloud or an enterprise resource planning (ERP) system, so that signaling takes place as part of a maintenance plan, in particular in a maintenance plan.

Basically, the monitoring unit 46 is also set up to send a warning signal to the user interface 74 if the monitoring unit 46 has determined that the geometric state of the sealing element 28 corresponds to insufficient compression of the sealing element 28. The warning signal may be a visual and/or acoustic warning signal, provided that it is suitable for informing a user of the geometric state of the sealing element 28.

If a qualitative evaluation of the plug-in connection 12 is optionally provided, the monitoring unit 46 can determine whether the geometric state of the sealing element 28 reaches, exceeds or falls below a predetermined threshold value.

It is also conceivable to provide the warning signal in the form of a (red) light which sends a visual warning signal directly to the user. Such a visual warning signal can also be accompanied by an acoustic warning signal in the form of a beep or whistle. A user can also be informed of the state of the sealing element 28 via a mobile terminal device by means of a push message.

Basically, the components of the monitoring unit 46 can be provided together in one device or at one location. Alternatively, the components of the monitoring unit 46 can be distributed, i.e., at different locations.

The respective connection between the evaluation unit 70 and the measuring unit 68 and/or the user interface 74 is basically adapted to transmit data. For example, the connection is an optical fiber cable, an Ethernet connection or the like. However, it is also conceivable that the connection is a wireless communication connection, for example a WLAN mobile radio connection such as LTE, 5G, 6G, Low Power Wide Area Network (LPWAN or LPN), e.g. Mioty, or a Bluetooth connection.

Figure 3:
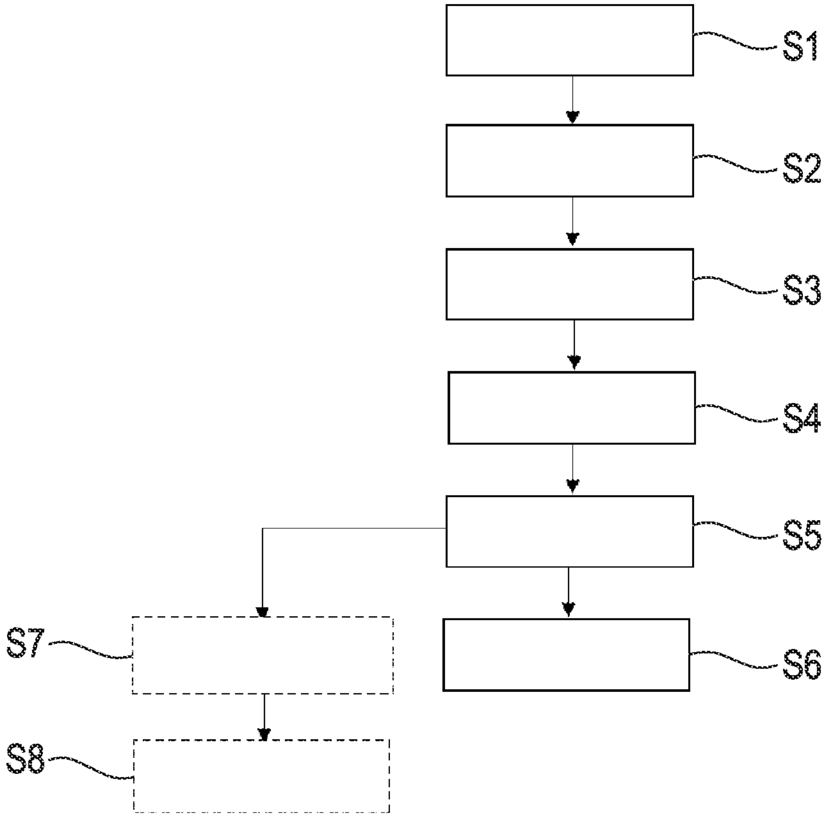
FIG. 3 shows a schematic sequence of the steps of a method of forming a plug-in connection using a plug-in system shown in FIG. 1.

The schematic sequence of a method of forming a plug-in connection 12 using a plug-in system 10 is explained in more detail below with reference to FIG. 3.

In a first step S1, a plug-in system 10 is provided as described above.

In a second step S2, the plug 14 is inserted into the socket 18 so that the plug 14, in particular the actuating element 16, acts on the sealing element 28 such that the sealing element 28 deforms, as a result of which an electrically conductive connection is established between the contact element 20 and the contact surface 22 via the sealing element 28 which is arranged between the contact element 20 and the contact surface 22.

In a third step S3, the monitoring unit 46 detects at least one parameter which is representative of the geometric state of the sealing element 28. For this purpose, the measuring unit 68 measures, for example, an electrical characteristic value of the correspondingly established electrical connection in an assembled state of the plug-in connection 12.

In a fourth step S4, the measuring unit 68 forwards the electrical characteristic value to the evaluation unit 70.

In a fifth step S5, the recorded electrical characteristic value is evaluated. Here, it is initially only possible to detect whether the plug-in connection 12 is correctly formed, which is accompanied by a deformation of the sealing element 28, which is accompanied by the electrical connection between the contact element 20 and the contact surface 22 via the deformed sealing element 28, which is synonymous with sufficient sealing functionality due to the deformed sealing element 28.

In a sixth step S6, the corresponding information about the state of the sealing element 28 and/or a warning signal is output, in particular via the user interface 74.

Optionally, in a seventh step S7 (shown in a dashed line), it can be provided that the recorded electrical characteristic value is compared with predetermined values stored in the database 72, which are each linked to upsettings or deformations of the sealing element 28. In this way, the measured electrical characteristic value can be assigned to a predetermined electrical characteristic value, and thus also to an associated upsetting or deformation of the sealing element 28.

Optionally, a compression value can also be calculated.

Alternatively, the evaluation can be performed using a server system.

In an optional eighth step S8, the result of the evaluation can also be output, in particular via the user interface 74.

List of reference numerals

| Reference numeral | designation |
|---|---|
| 10 | plug-in system |
| 12 | plug-in connection |
| 14 | plug |
| 16 | actuating element |
| 18 | socket |
| 20 | contact element |
| 22 | contact surface |
| 24 | end face |
| 26 | sealing space |
| 28 | sealing element |
| 30 | contact carrier |
| 32 | opening |
| 34 | base section |
| 36 | front side |
| 38 | contact openings |
| 40 | contacts |
| 42 | support surface |
| 44 | threaded sleeve |
| 46 | monitoring unit |
| 48 | lines |
| 50 | union nut |
| 52 | external thread |
| 54 | threaded connection |
| 56 | internal thread |
| 58 | circumferential wall |
| 60 | contact carrier sleeve |
| 62 | thickened portion |
| 64 | stop |
| 66 | support area |

-continued

List of reference numerals

| Reference numeral | designation |
|---|---|
| 68 | measuring unit |
| 70 | evaluation unit |
| 72 | database |
| 74 | user interface |

The invention claimed is:

1. A plug-in system for producing a plug-in connection, having a socket for receiving a plug, the socket comprising a contact element, a contact surface and an electrically conductive sealing element, the sealing element being arranged between the contact element and the contact surface, the sealing element establishing an electrical connection between the contact surface and the contact element in an assembled state of the plug-in connection, the sealing element being designed such that the electrical connection between the contact element and the contact surface is interrupted in an unstressed state of the sealing element, wherein the plug-in system has a monitoring unit which is connected to the contact element and the contact surface, and wherein the monitoring unit is set up to detect whether the electrical connection is present via the sealing element in the assembled state of the plug-in connection.

2. The plug-in system according to claim 1, wherein the monitoring unit is set up to detect a deformation of the sealing element.

3. The plug-in system according to claim 1, wherein the monitoring unit has a measuring unit which is set up to detect at least one electrical characteristic value of the electrical connection between the contact element and the contact surface.

4. The plug-in system according to claim 3, wherein the monitoring unit is set up to detect a deformation of the sealing element, wherein the monitoring unit has an evaluation unit which is connected in an information-exchanging manner to a database in which predetermined electrical characteristic values linked to deformations are stored, the evaluation unit being set up to determine the deformation of the sealing element on a basis of the characteristic values stored in the database.

5. The plug-in system according to claim 1, wherein the monitoring unit has a user interface which is set up to provide a user with at least one piece of information about a geometric state of the sealing element and/or to output a warning signal.

6. The plug-in system according to claim 1, wherein in the unstressed state, the sealing element rests against the contact surface.

7. The plug-in system according to claim 1, wherein the contact surface is formed on a threaded sleeve which is stationary.

8. The plug-in system according to claim 1, wherein the contact element is configured as a contact pin.

9. The plug-in system according to claim 1, wherein the contact element is at least partially embedded in a contact carrier, the contact carrier providing a support surface for the unstressed sealing element.

10. The plug-in system according to claim 9, wherein the contact carrier provides a plurality of contact openings on its front side for corresponding electrical contacts of the plug.

11. The plug-in system according to claim 9, wherein a plurality of contact elements are provided, which are arranged distributed along a circumference of the contact carrier.

12. The plug-in system according to claim 9, wherein the contact carrier has a stop limiting an insertion depth of the plug.

13. The plug-in system according to claim 1, wherein the contact element has a convexly shaped front side which faces the sealing element.

14. The plug-in system according to claim 1, wherein the sealing element is configured as a molded seal or a sealing ring.

15. The plug-in system according to claim 1, wherein the sealing element is configured as an O-ring.

16. A method of forming a plug-in connection using the plug-in system according to claim 1, the method comprising steps of:

providing the plug-in system, inserting a plug into the socket so that the plug acts on the sealing element such that the sealing element deforms, an electrically conductive connection being thus established between the contact element and the contact surface via the sealing element.

* * * * *